March 2, 1926.

J. C. REYNOLDS

VALVE

Filed Dec. 29, 1924

1,575,280

Inventor

J. C. Reynolds

By Lacy & Lacy, Attorneys

Patented Mar. 2, 1926.

1,575,280

UNITED STATES PATENT OFFICE.

JOSHUA C. REYNOLDS, OF LOUISVILLE, KENTUCKY.

VALVE.

Application filed December 29, 1924. Serial No. 758,771.

*To all whom it may concern:*

Be it known that I, JOSHUA C. REYNOLDS, a citizen of the United States, residing at Louisville, in the county of Jefferson and State of Kentucky, have invented certain new and useful Improvements in Valves, of which the following is a specification.

This invention relates to improvements in check valves and more particularly to that type past which air or other fluid is to be delivered, under pressure, to a container with which the valve is associated, and which will prevent the escape of the air or other fluid from the said container, and while the valve embodying the invention is designed primarily for use upon compressed air tanks, it may equally well be employed in connection with pneumatic tire tubes and various other chambers, containers, etc., to which air or gaseous fluids are to be supplied under pressure and stored.

One of the objects of the present invention is to provide a valve of the type referred to which will operate in such a manner as to permit of the free passage of air or other gaseous fluid under pressure past its valve element and will, on the other hand, effectually prevent any escape of air or other fluid so delivered to the tank or other container equipped with the valve.

Another object of the invention is to provide a valve which will be so constructed that sticking of the valve element is positively precluded so that the tube or other means for supplying the air or other fluid under pressure past the valve, may be removed without the necessity of exercising any care or paying any attention whatsoever to the valve.

Another object of the invention is to provide an extremely simple construction of valve of the check type embodying a minimum number of parts of such form and construction that they may be manufactured at a very low cost and readily and quickly assembled, and in this connection the invention likewise contemplates so constructing the valve that its parts may be readily disassembled in the event it becomes necessary to repair or replace any of the said parts.

Figure 1:
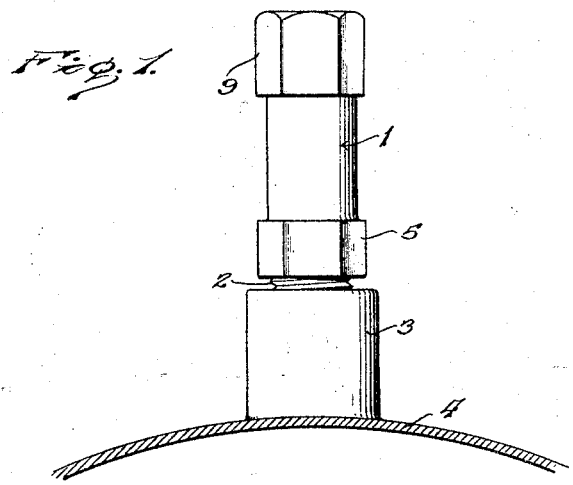
Figure 1 is a view in elevation of the valve embodying the invention installed upon a pressure tank.

The valve comprises a casing which is indicated in general by the numeral 1 and is in the form of an integral substantially cylindrical body which is exteriorly threaded at one end as indicated by the numeral 2 so as to adapt its said end to be fitted into a threaded boss 3 upon the wall of the tank, as indicated by the numeral 4, or into any other socket provided for its reception, and in order that the application of the casing to the tank or other container may be facilitated, the valve body 1 is formed exteriorly above its threaded portion 2, with a polygonal portion 5 for the application thereto of a wrench. The valve body is likewise exteriorly threaded at its upper end as indicated by the numeral 6 so that the coupling member 7 of a fluid pressure supply tube or hose 8 may be connected to this end of the valve or, when the tank has been supplied with the required volume of air or other gaseous fluid under pressure, a dust cap 9 may be fitted to this end of the valve casing, after removal of the connection 7.

The valve body is formed with an axial bore 10 and this bore is reduced in diameter at the intermediate portion of its length, as indicated by the numeral 11, and further reduced in diameter, at its upper end, as indicated by the numeral 12. The wall of the reduced portion 11 is threaded for a portion of its length as indicated by the numeral 13, and the said wall of the said reduced portion 11, at and adjacent its juncture with the lower end of the reduced portion 12, is of concave form so as to provide a valve seat indicated by the numeral 14, located at the lower end of the said reduced portion 12. Removably fitted into the threaded portion 13 of the bore of the casing is a valve retaining member 15 comprising a substantially cylindrical body exteriorly threaded as at 16 to fit the threads 13 and provided with an axial bore 17 which is preferably of the same diameter as the reduced portion 12 of the bore of the valve casing. In order that the retaining member 15 may be conveniently threaded into the valve casing 1, and likewise for a purpose to be presently explained, the said retaining member is formed at each end with a diametric groove indicated by the numeral 18, in which the bit of a screw driver may be engaged in fitting the member in the valve casing and removing the same.

Figure 2:
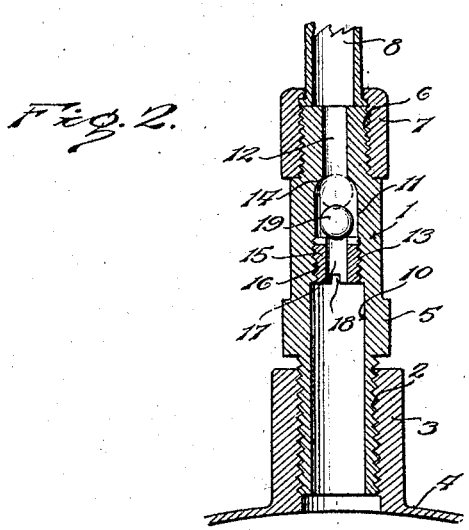
Figure 2 is a vertical diametric sectional view through the valve.

The valve proper comprises a spherical ball 19 of steel or other metal, depending upon the nature of the gaseous fluid to be forced into the tank under pressure, and said valve element is housed within the reduced portion 11 of the casing and retained therein by the retaining member 15. It will be observed that inasmuch as one of the grooves 18 is provided in each end of the retaining member 15, the retaining member may be inserted either end first into the casing and yet if, after the valve has been in use a considerable period of time, it should be found that that end of the member which is presented toward the valve seat 14 has become battered or worn, the member may be removed and reversed end for end and refitted into the casing. As previously stated, the groove 18 serves not only to accommodate the bit of a screw driver whereby the retaining member may be threaded into place in the casing, but also serves another function, and by reference to Figure 2 it will be observed that while the valve 19 normally occupies the dotted line position shown in said figure, in which position it will rest firmly against the seat 14 and effectually prevent the escape of the compressed gaseous fluid from the tank 4, at each compression stroke of the pump employed in compressing the fluid and delivering the same to the tank past the valve, the valve will move to the full line position shown in the said figure, in which position it will momentarily rest upon the upper end of the retaining member and at the upper end of the bore therein, the surface of the valve contacting the corners of the wall of the groove which are next adjacent the said upper end of the bore 17. When the valve is in this position, the bore 17 will not be closed for the air or other gaseous fluid delivered by the compressing apparatus will flow freely around the valve and through the groove 18 into and through the bore 17 to the tank 4. It will also be observed by reference to Figure 2, that the valve element 19 is of a diameter less than that of the reduced portion 11 of the bore of the valve casing and, in fact, of such diameter that the space between the circumference of the ball and the wall of said reduced portion 11 of the bore of the valve casing will be equal in area to the cross sectional area of the portion 12 of the bore of the valve casing or the bore 17 of the retaining member, so that there is no appreciable resistance offered to the free passage of the fluid under pressure past the valve and the effect is approximately the same as though a continuous bore were provided connecting the bores 12 and 17. Therefore, the valve element does not materially obstruct the passage of introduced fluid under pressure and, at the same time, when the pumping or compressing means ceases to operate and the delivery pipe therefrom is disconnected from the valve casing, the pressure of the air or other gaseous fluid in the tank will serve to firmly seat the valve element and prevent any escape of such fluid.

Having thus described the invention, what I claim is:

A valve comprising an elongated tubular body having its upper and lower end portions externally threaded and formed with an axially disposed bore, the lower portion of the bore being of greater diameter than the intermediate portion thereof and the upper portion of the bore being of less diameter than the said intermediate portion, the intermediate portion of said bore having a threaded portion and being formed with a rounded upper end forming a cup-shaped valve seat at its junction with the reduced upper end portion of the bore, a valve ball support screwed into the threaded portion of the intermediate portion of said bore and formed with a bore providing communication between the intermediate portion and lower portion of the bore of said body, the upper and lower ends of said support being formed with radial grooves intersecting its bore, and a valve ball in the intermediate portion of the bore of said body freely movable longitudinally therein from seating engagement with the upper end of the valve support to seating engagement with said valve seat.

In testimony whereof I affix my signature.

J. C. REYNOLDS. [L. S.]